United States Patent [19]

Brownlow

[11] 4,303,547

[45] Dec. 1, 1981

[54] LUMINESCENT MATERIAL

[75] Inventor: James M. Brownlow, Crompond, N.Y.

[73] Assignee: International Business Machines Corporation, Armonk, N.Y.

[21] Appl. No.: 107,946

[22] Filed: Dec. 28, 1979

[51] Int. Cl.$^3$ .......................... C09K 11/30; C03C 3/28
[52] U.S. Cl. .............................. 252/301.4 F; 501/54; 501/66; 501/905
[58] Field of Search ............... 252/301.4 F; 106/47 Q, 106/52

[56] References Cited

U.S. PATENT DOCUMENTS

| | | | |
|---|---|---|---|
| 2,440,048 | 4/1948 | Hood | 252/301.4 F |
| 3,323,926 | 6/1967 | O'Leary | 252/301.4 F X |
| 3,506,587 | 4/1970 | Turner et al. | 252/301.4 F |
| 3,528,829 | 9/1970 | Tryggve et al. | 106/52 |
| 3,543,074 | 11/1970 | Turner et al. | 252/301.4 F |
| 3,982,918 | 9/1976 | Frieser et al. | 106/47 Q |

OTHER PUBLICATIONS

Claffy et al. "J. Electrochem. Soc.", vol. 98, No. 10, pp. 409-413, 1951.

*Primary Examiner*—Jack Cooper
*Attorney, Agent, or Firm*—Alvin J. Riddles

[57] ABSTRACT

Luminescent material may be fabricated of silicon dioxide containing as activators approximately up to 1% monovalent copper together with up to approximately 15% aluminum. The material may be in powder form, it may be in glass form or it may be produced by electrolytic ingredient transfer. The material is luminescent in the blue range from 380-580 nanometers.

3 Claims, No Drawings

LUMINESCENT MATERIAL

DESCRIPTION

1. Technical Field

The technical field of the invention is that of materials that convert light energy at one frequency to light energy at another frequency. Such materials have come to be known in the art as luminescent materials or phosphors. In the presence of a background light of a certain frequency the emitted light from such materials will be of a different frequency and will be predominantly of one wavelength. The performance of luminescent materials is usually influenced by the presence of materials serving as activators.

2. Background Art

Luminescent materials have been used in a variety of applications in the art. One principal example is in displays where the luminescent materials with various physical property-imparting activators are stimulated by energy sources such as electron beams.

For display purposes, as described in U.S. Pat. No. 2,876,129, a metal coating was deposited on and annealed into a glass envelope to provide fluorescent properties to a television screen.

Copper has been known as a phosphor activator in U.S. Pat. No. 2,570,136 and copper doped aluminosilicate phosphors have been known and described in the Journal of The Electrochemical Society, Vol. 98, No. 2, October 1951, pp. 409-413.

Luminescence in the blue range from about 420-570 nanometers is desirable for a variety of applications. Such luminescence has been achieved using lanthanides as the phosphor activator. The lanthanide activated materials, however, have been found to require close control on the purity of the ingredients, to give narrow band emission and the luminescent output diminishes above 300° C.

Weak blue luminescence, further has been observed in natural, somewhat impure, quartz that has been melted to silica glass.

DISCLOSURE OF INVENTION

Luminescent materials may be fabricated with the principal ingredient being silicon dioxide and, as activators both monovalent copper and aluminum additives are simultaneously present. The additives are present as $Cu^+$ and $Al^{+++}$ ions. The luminescent output is intense and extends over a range from the vicinity of 380-570 nanometers with a peak in the blue color range.

Significant luminescent intensity occurs when the copper ingredient is in the vicinity of 0.08% to 0.85% $Cu_2O$ at the same time the $Al_2O_3$ ingredient is in the vicinity of 1.2% to 15%. The luminescent material is not sensitive to ingredient purity within 1% and maintains light output until the temperature exceeds 500° C. The luminescent material may be in powder form. It may be in the form of a clear glass or it may be in the form of an electrolytically converted commercial glass.

BEST MODE FOR CARRYING OUT INVENTION

In accordance with the invention, blue luminescent material is made by adding finally divided silicic acid and quantities of cupric nitrate and aluminum nitrate to provide concentrations of cuprous oxide within the range 0.08 to 0.85 Mole % and aluminum oxide in the range of 1.2 to 15 Mole %.

The relative concentrations in Mole % of the critical ingredients and the corresponding relative visual intensity are shown for a number of examples in Table I.

TABLE I

| POWDERS COMPOSITION MOLE % | | | INTENSITY % Compared With |
|---|---|---|---|
| $Cu_2O$ | $Al_2O_3$ | $SiO_2$ | ZnO |
| .08 | .19 | 99.73 | 15 |
| .12 | .12 | 99.76 | 19 |
| .12 | 1.2 | 98.68 | 24 |
| .2 | 4.0 | 95.8 | 25 |
| .34 | 2.4 | 97.26 | 27 |
| .34 | 3.0 | 96.6 | 31 |
| .42 | 1.2 | 98.38 | 33 |
| .42 | 3.8 | 95.78 | 34 |
| .42 | 10.0 | 89.58 | 30 |
| .42 | 12. | 87.58 | 24 |
| .65 | 2.4 | 95.95 | 20 |
| .85 | 4.0 | 95.15 | 15 |
| 0 | 4 | 96 | <1 |
| 0.42 | 0 | 99.58 | <1 |
| 0.4 | 15 | 84.6 | 15 |

Visual intensity is measured relative to an intensity value of 100 exhibited by commercially available zinc oxide luminescent material under 245 nanometer mercury light using a photocell and a voltmeter. The commercially available zinc oxide material is manufactured by Sylvania Electric Products, Inc. and is available commercially under the designation P-15.

From Table I it may be seen that the intensity peaks where the range of cuprous oxide is from 0.34 to 0.42% and where the range of aluminum is 1.2 to 10%. Intensities of 15 and above may be considered useful.

The luminescent material may be prepared as is set forth in the following examples.

EXAMPLE A

Luminescent Powder

Phosphor powders may be made with silicic acid, cupric nitrate, aluminum nitrate and an additive boric acid. These are mixed with water, alcohol and acetic acid. A ball mill or magnetic stirring can be used. The mixture is poured into shallow dishes to dry at approximately 120° C. The dried cake is then broken, placed in refractory boats or crucibles and heated approximately 1150° C. for from 5 to 30 minutes. Luminescent activity becomes apparent at 600° C. and is fully developed by 1150° C. The heating is done in the presence of wet nitrogen containing from 0 to 2% of hydrogen in order to keep the copper monovalent. The product of firing is then cooled rapidly to avoid oxidation of the copper. The cooled material may be shaped, spread on a substrate or preferably ground to powder form. The resulting powder when measured under mercury light at 245 nanometer wavelength by photocell and voltmeter instrumentation is equal in brightness to commercially available zinc silicate or zinc oxide luminescent materials. The zinc silicate material is produced by Sylvania Electric Products, Inc. and is designated P-39. The zinc oxide material is prepared by Sylvania Electric Products and is designated P15.

The luminescent powder further has been found to emit light over a band from 380 to 570 nanometers. The luminescent cavity is retained to higher temperatures. Useful light is obtained to 550° C.

EXAMPLE B

Luminescent Powders

The addition of boron has been found to produce the brightest phosphor powders.

Luminescent powder in accordance with the invention may be provided with the following starting ingredients.

Place:

| | $Cu^+$ | $Al^{+++}$ | $SiO_2$ | $B_2O_3$ |
|---|---|---|---|---|
| in the form of oxides, carbonates, hydroxides or nitrates. | | | | |
| By Mole % | 0.5 | 5.5 | 85.8 | 8.2 |
| By WT % | $Cu(NO_2)_2$ | $Al(NO_3)_3 \cdot 9 H_2O$ | $SiO_2 \times H_2O$ | $H_3BO_3$ |
| gms | 0.56 | 8 | 16 | 2 |
| In: | 21cc $H_2O$, | 5cc methanol, | 3cc acetic acid | |

And:

ball mill for 20 minutes, dry in a shallow glass dish then fire at 1150° C. for 12 minutes in an ambient of wet nitrogen 98% gas with 1-2% hydrogen. Thereafter, grind the material to a powder.

The light output is comparable to that exhibited by commercial zinc silicate and zinc oxide when stimulated under 245 nm Hg light. The luminescent powder further has been found to emit light over a band from 380–570 nanometers.

TABLE II indicates examples of concentrations for intensity ranges.

TABLE II

| COMPOSITION MOLE % | | | | INTENSITY % Compared With ZnO | |
|---|---|---|---|---|---|
| $Cu_2O$ | $Al_2O_3$ | $SiO_2$ | $B_2O_3$ | Furnace Gas Wet Nitrogen | Furnace Gas Air |
| .34 | 3 | 96.5 | 0 | 31 | |
| .47 | 4 | 93.53 | 2 | 45 | |
| .4 | 3 | 94.1 | 2.5 | 79 | |
| .4 | 4 | 93.6 | 3 | 98 | |
| .6 | 6 | 89.9 | 4.5 | 100 | |
| .6 | 6 | 87.4 | 6 | 94 | |
| .5 | 5.5 | 85.8 | 8.2 | 100 | |
| .66 | 10 | 80.34 | 9 | 98 | |
| .55 | 4 | 86.45 | 9 | 104 | 60 |
| .55 | 8 | 82.45 | 9 | 104 | 55 |
| .5 | 8 | 81.5 | 10 | 70 | |
| .5 | 4 | 82.3 | 12 | 79 | |
| .7 | 4 | 92.3 | 3 | 79 | |
| .5 | 15 | 86.5 | 8 | 57 | |
| .85 | 4 | 91.15 | 4 | 70 | |
| .2 | 4 | 91.8 | 4 | 61 | |
| 0 | 4 | 92.0 | 4 | <1 | |

It may be noted from TABLE II that substitution of Air for Wet Nitrogen results in loss of intensity illustrating the requirement that the copper be monovalent.

EXAMPLE C

Luminescent Glass

Where a glass article is the desired form of the luminescent material there must be added an alkali metal oxide to adjust the viscosity to be within the range that permits bubbles to be eliminated in melting. Lithium sodium or potassium oxides may be employed. Lithium is found to be preferred because it produces brighter luminescent materials than sodium or potassium.

Luminescent glasses in accordance with the invention may be provided with the following starting ingredients.

Place:

| | $Cu^+$ | $Al^{+++}$ | $SiO_2$ | $Li_2O$ | $B_2O_3$ |
|---|---|---|---|---|---|
| in the form of oxides, carbonates, hydroxides or carbonates. | | | | | |
| By Mole % | 0.3 | 5.1 | 64.0 | 20.6 | 10.0 |

Mix in:

100 cc methanol, 12 cc $NH_4OH$, 16 cc acetic acid and stir for 20 minutes, dry, and melt in a platinum crucible for 1 hour at 1300° C. in a wet nitrogen ambient. The material may then be poured or fabricated into a desired shape.

The glass is clear, luminesces over a range from 380 nanometer to 570 nanometers with a peak at 520 nanometers with an intensity when in powder form that is 12% compared with zinc silicate or zinc oxide when stimulated with a mercury light at 245 nanometers.

TABLE III indicates examples of concentrations for intensity ranges.

TABLE III

| COMPOSITION MOLE % GLASSES | | | | | INTENSITY In Powder Form - |
|---|---|---|---|---|---|
| $Cu_2O$ | $Al_2O_3$ | $SiO_2$ | $B_2O_3$ | $Li_2O$ | % Compared With ZnO |
| 0.30 | 5.1 | 64.0 | 10 | 20.6 | 12 |
| 0.4 | 5.0 | 75.2 | 7.5 | 11.0 | 9 |
| 0.8 | 5.0 | 53.2 | 19.0 | 22.0 | 10 |
| 0.42 | 4.2 | 71.1 | 6.7 | 16.6 | 9 |

It is also possible to provide the luminescent material of the invention by electrolytically altering the ingredients in existing commercially available glasses. The alteration can operate to remove an ingredient or to replace an ingredient with another.

EXAMPLE D

Electrolytically altered commercially available glass

There is a heat resistant glass that contains approximately 96% $SiO_2$, approximately 4% $B_2O_3$ and in the vicinity of less than 1% of $Na_2$ and of $Al_2O_3$. The glass is commercially available under the "Vycor" trademark of the Corning Glass Company. It is possible to replace the sodium in such a glass with the $Cu^+$ of the invention by electrolysis at 700°–800° C. This is done by providing an electrode system containing the ingredient to be electrolytically transferred. A lead borosilicate glass electrode system is provided containing approximately 1-5 Mole % of $Cu_2O$, approximately 45 Mole % of PbO, approximately 45% $B_2O_3$ and approximately 5% to $SiO_2$. A "Vycor" glass disk is positioned having on opposing sides thereof a powder layer of the lead borosilicate electrode system. Electrical wire connections of nichrome are held in contact with this electrode system and while the assembly is maintained at 730° C., 500 V d.c. is applied for about 5 to 15 minutes.

Upon cooling, the lead borosilicate electrode system is removed with nitric acid.

The resulting luminescent glass exhibits a bright blue luminescent property of 30% intensity compared with P-15 as measured by photocell and voltmeter instrumentation.

The electrolytically altered glass has a composition of 96% $SiO_2$, 4% $B_2O_3$ and less than 1% CuO and $Al_2O_3$.

The glass withstands a temperature of 800° C., is resistant to heat shock and has a low coefficient of expansion. The luminescent activity is retained to a 550° C. temperature.

What has been described is a luminescent material or phosphor of of $SiO_2$ with approximately 0.08 to 0.85 Mole % cuprous oxide providing monovalent copper and from approximately 1.2 to 15 Mole % aluminum oxide, that luminesces in a broad blue band from about 380 to 520 nanometer wavelength with a maximum intensity using an addition of boron. It may be produced from inexpensive ingredients, is not sensitive as to precise ingredient compositions and presence of other ingredients and is active to high temperatures. Such material may be provided in powder form, glass form and altered commercial glass form. In powder form it is responsive to ultraviolet stimulation for lighting purposes, cathode ray stimulation for display purposes and X-ray stimulation for medical and special applications. In glass form it can be stimulated by photo, electron bombardment or by X-rays. Since the glass can be fabricated in a desired shape and other property imparting dopants can be included, a stimulated emission of radiation device such as a neodymium laser may be fabricated. Further, in laser type applications, the providing of the material of the invention by the electrolytic transfer of ingredients permits glasses that have a low thermal coefficient of expansion and that will support higher energy detuning or will prevent bursting from heat shock. The glasses of the invention are useful as light sources when photo stimulated by a short wavelength light such as a mercury vapor lamp. They may be applied as a coating or inactive glasses.

Having described the invention, what is claimed as new and what is desired to secure by Letters Patent is:

1. A $Cu^+$ and $Al^{+3}$ activated luminescent material exhibiting emission in the wavelength range of 380 to 570 nanometers with a peak in the blue color range when excited by 245 nanometer mercury light consisting of the fired product of the three following ingredients:
   silicon dioxide in the range of 84.6 to 99.76 mol %
   cuprous oxide in the range of 0.08 to 0.85 mol % and
   $Al_2O_3$ in the range of 0.12 to 15 mol %.

2. A $Cu^+$ and $Al^{+3}$ activated luminescent material exhibiting emission in the wavelengthh range of 380 to 570 nanometers with a peak in the blue color range when excited by 245 nanometer mercury light consisting of the fired product of the four following ingredients:
   silicon dioxide in the range of 80.34 to 94.1 mol %
   cuprous oxide in the range of 0.2 to 0.85 mol %
   $Al_2O_3$ in the range of 3.0 to 15.0 mol % and
   $B_2O_3$ in the range of 2.0 to 12.0 mol %.

3. A $Cu^+$ and $Al^{+3}$ activated luminescent glass exhibiting emission in the wavelength range of 380 to 570 nanometers with a peak at 520 nanometers when excited by 245 nanometer mercury light consisting of the fused product of the following five ingredients:
   silicon dioxide in the range of 53.2 to 75.2 mol %
   cuprous oxide in the range of 0.3 to 0.8 mol %
   $Al_2O_3$ in the range of 4.2 to 5.1 mol %
   $B_2O_3$ in the range of 6.7 to 19 mol % and
   a viscosity adjuster selected from the group of lithium oxide, sodium oxide and potassium oxide in the range of 11.0 to 22.0 mol %.

* * * * *